United States Patent Office 3,399,643
Patented Sept. 3, 1968

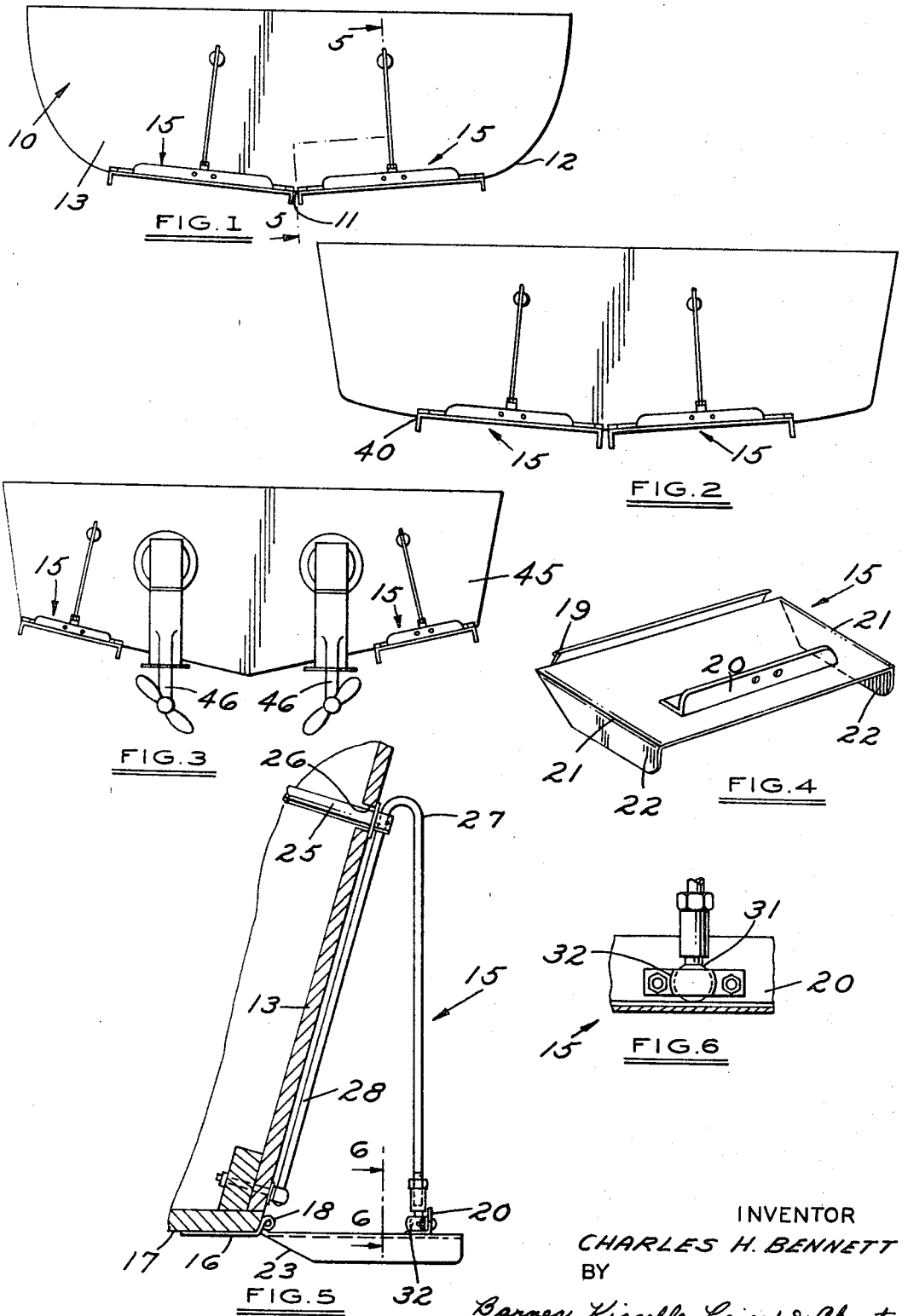

3,399,643
TRIM ATTACHMENT FOR POWER BOATS
Charles H. Bennett, 14845 Plymouth Road,
Detroit, Mich. 48227
Filed Mar. 20, 1967, Ser. No. 624,345
16 Claims. (Cl. 114—66.5)

ABSTRACT OF THE DISCLOSURE

The trim attachment shown herein comprises a pair of trim members which are hinged to the stern along their forward edges and have downwardly extending walls along the side edges. Power operated means extend between the trim members and the stern of the boat to actuate the trim members. The trim members have a flange adjacent the rear edge tending to rigidify the member along the rear edge. Each trim member is made of flexible material so that it will flex in the manner that when one rear corner moves in one direction, the other rear corner moves vertically in the opposite direction.

---

This invention relates to boating and particularly to power boats.

Background of the invention

In my prior Patents 3,062,167, issued Nov. 6, 1962, and 3,111,103, issued Nov. 19, 1963, entitled, "Trim Attachment For Power Boats," there is disclosed and claimed a trim attachment for power boats particularly adapted for power boats having a keel line which varies in inclination to the chine line and wherein the trim attachment comprises a pair of trim members which are hinged to the stern of the boat about transverse axes. Each trim member is of substantially uniformly thick material and includes means on a top surface thereof adjacent the rear edge thereof rigidifying the trim member so that the trim members will flex due to varying movement of water along the keel and chine lines with one corner of each trim member moving upwardly and the other corner of each trim member moving downwardly. Power operated means operate each trim member to control its attitude relative to the boat. Such an arrangement permits longitudinal and lateral trimming of the boat under varying load in order to obtain optimum attitude for movement of the boat through the water and results in greater speed with less fuel consumption, improved visibility and permits adjustment so that compensation can be made for varying load conditions and can be removed in rough water.

Trim attachments of the type disclosed and claimed in the aforementioned patents have been found to be very effective and have been commercially successful. However, in such trim members, there may be some loss of efficiency due to the flow of water laterally outwardly from the side edges of the trim members. In installations where it is possible to make the trim members of substantial span or lateral width, this results in only a small percentage loss of the total lifting force. On the other hand, in smaller boats or on boats where the lateral span is restricted due to the configuration of the underside of the boat or due to appendages, the percentage of total lift that is lost due to movement of the water laterally outwardly along the sides of the trim member may be appreciable.

It is therefore an object of the invention to provide trim attachments for power boats wherein the losses due to flow of water laterally outwardly along the side edges are substantially eliminated.

It is a further object of the invention to provide an improved trim attachment for power boats which can be used on smaller boats or boats that have a span which is restricted due to configuration or appendages and at the same time achieve the desired lift for correction of the atitude of the boat.

Summary

The trim attachment shown herein comprises a pair of trim members which are hinged to the stern along their forward edges and have downwardly extending walls along the side edges. Power operated means extend between the trim members and the stern of the boat to actuate the trim members. The trim members have a flange adjacent the rear edge tending to rigidify the member along the rear edge. Each trim member is made of flexible material so that it will flex in the manner that when one rear corner moves in one direction, the other rear corner moves vertically in the opposite direction.

Description of the drawings

FIG. 1 is a rear elevational view of a boat embodying the invention.

FIG. 2 is a rear elevational view of the invention as applied to a different type of boat.

FIG. 3 is a rear elevational view of the invention as applied to a still different type of boat.

FIG. 4 is a perspective view of a trim member embodying the invention.

FIG. 5 is a fragmentary sectional view taken along the line 5–5 in FIG. 1.

FIG. 6 is a fragmentary sectional view on an enlarged scale taken along the line 6–6 in FIG. 5.

Description

Referring to FIGS. 1, 4, 5 and 6, the invention is shown as applied to a power boat 10 of the type wherein the bottom planking is not flat, that is, which has a keel 11 that tapers upwardly toward the stern of the boat and a chine line 12 that tapers generally horizontally and downwardly relative to the keel. The boat includes a transom 13 which is usually inclined upwardly and rearwardly.

According to the invention, a pair of trim members 15 are hinged to the boat adjacent the bottom thereof. As shown in FIG. 4, each trim member 15 is made of a generally uniformly thick material such as stainless steel that is flexible, as presently described. Each trim member or tab 15 is generally rectangular and flat and is hinged along its forward edge to a hinge member 16 on the bottom of the boat at the junction of the transom with the undersurface 17 of the boat. Hinge member 16 is formed at its rear edge with a curved portion 18 which defines a loop. The free edge of the curved portion 18 defines a space into which a flat upwardly extending lip 19 on the forward edge of the trim member 15 extends. By this arrangement the trim member is hinged on the boat with the bottom surface of the trim member being substantially flat and adjacent the bottom 17 of the boat.

Each trim member includes an upwardly turned flange 20 on the rear edge thereof which terminates short of the side edges 21 and downwardly extending walls 22 that extend from the side edges. The forward edge 23 of each wall 22 is tapered downwardly and rearwardly and the height of the wall may be three inches, for example. A mechanism is provided for pivoting the trim member about its hinge and includes a shaft 25 that is slidable in an opening 26 in the transom. Shaft 25 slidably receives a V-shaped link 27 that has one arm 28 extending along the transom and journalled by a ball 29 in a socket 30 and the other arm thereof journalled to the flange 20 by a ball 31 in a socket bracket 32 on the flange.

The details of the mechanism for moving the trim member may be substantially identical to those shown in my Patent 3,111,103.

The tab is preferably made of a uniformly thick material that is flexible, such as stainless steel sheet of about 12 to 14 gauge. When the trim tab is extended downwardly below the horizontal and the boat is driven through the water, the inherent flexibility of the material of the trim member permits it to flex so that the tab conforms with the curvature of the bottom planking or surface at the stern. The outermost portion of each table tends to follow the contour of the chine line, namely, tapered downwardly, while the innermost portion tends to follow the taper of the keel line, namely, tapering upwardly.

It has been found that in use the walls 22 tend to minimize the lateral flow of water beneath the trim members so that there is a minimal loss of lift. As a result, there is a gerater overall efficiency in the trim tabs.

In FIG. 2, the invention is shown as applied to a different type of boat which is formed with an undercut portion 40 on the underside thereof. The trim members are positioned so that their undersurface generally corresponds to the underside of the boat. Since the trim tabs 15 extend across only a portion of the bottom of the boat, it is essential that maximum lift be achieved. The use of the trim tabs embodying the invention produces a maximum lift.

In FIG. 3, the invention is shown as applied to a still different type of boat 45 which has twin screws 46. The trim members 15 are mounted laterally outwardly from the screws 46. As in the boat shown in FIG. 2, the trim tabs necessarily can extend laterally across only a portion of the bottom of the boat and therefore must be narrower than the trim tab shown in FIG. 1. By utilizing the trim tabs embodying the invention, maximum lift in the available area is insured even thought the trim tabs are narrower.

Since the laterial or transverse width of each trim tab is necessarily restricted because of the configuration of the boat, the cross sectional area of the tabs which is available for lifting is necessarily less than in boats which are not restricted in configuration. In order to compensate for this, the longitudinal dimension of the trim tab can be increased beyond the flange 20 as shown in FIG. 4 to provide greater lift area.

Although the trim tabs have been particularly described with respect to boats having angularly related chine and keel lines, the trim tabs embodying the invention can also be used with boats that do not have such a chine and keel line relation.

I claim:

1. In a power boat, the combination comprising
   a pair of trim members hinged to the stern, one on each side of the center line of the boat,
   means for hinging each trim member along its forward edge to the boat,
   each said trim member having downwardly extending walls along the side edges thereof,
   and means extending between the boat and each said trim member intermediate the side edges of the trim member and substantially centrally thereof for varying the inclination of the trim member with respect to the boat.

2. The combination set forth in claim 1 wherein each trim member having means adjacent the rear edge thereof tending to rigidify the member and being made of a material such that the trim member is flexible and will flex in a manner such that when one rear corner moves vertically in one direction, the other rear corner moves vertically in the opposite direction.

3. The combination set forth in claim 2 wherein said means rigidifying said trim member comprises an angle member fixed to the top surface of said trim member and spaced from the rear edge of said trim member.

4. The combination set forth in claim 3 wherein said angle member terminates short of the side edges of said trim member.

5. The combination set forth in claim 1 wherein each said downwardly extending wall is integral with and bent downwardly from the side edges of the trim member.

6. The combination set forth in claim 1 wherein said trim member and said downwardly extending walls are made of substantially uniformly thick material.

7. The combination set forth in claim 4 wherein the forward edge of each said downwardly extending wall tapers downwardly and rearwardly.

8. The combination set forth in claim 1 wherein each said downwardly extending wall extends to a maximum vertical distance of approximately three inches.

9. The combination set forth in claim 1 wherein said hinging means comprises a hinge member fixed to the stern of the boat and having an edge defining a transverse loop that extends rearwardly along substantially the entire length of the hinge member woth the free edge thereof being substantially flat and extending forwardly beneath the body portion thereof adjacent the underside of the boat and defining a space opening downwardly,
   each said trim member having a substantially flat flange along substantially the entire length of the forward edge extending upwardly and rearwardly at an acute angle to the body of the trim member into said space thereby hinging said trim member to said hinge member.

10. The combination set forth in claim 1 wherein said means for varying the inclination of the trim member comprise a link in the form of an inverted V having a pair of diverging arms,
    each said arm being provided with a ball and socket connection, respectively, with the transom of the boat and the trim member.

11. For use in a power boat, the combination comprising
    a pair of trim members adapted to be hinged to the stern, one on each side of the center line of the boat, along its forward edge to the boat along a line lying in substantially in the plane of the underside of the boat within the lateral confines of the boat,
    each said trim member having downwardly extending walls along the side edges thereof,
    and means adapted to extend between the boat and each said trim member intermediate the side edges of the trim member and substantially centrally thereof for varying the inclination of the trim member with respect to the boat.

12. The combination set forth in claim 11 wherein each trim member having means adjacent the rear edge thereof tending to rigidify the member and being made of a material such that the trim member is flexible and will flex in a manner such that when one rear corner moves vertically in one direction, the other rear corner moves vertically in the opposite direction.

13. The combination set forth in claim 12 wherein said means rigidifying said trim member comprises an angle member fixed to the top surface of said trim member and spaced from the rear edge of said trim member.

14. The combination set forth in claim 13 wherein said flange member terminates short of the side edges of said trim member.

15. The combination set forth in claim 14 wherein said hinging means comprises a hinge member adapted to be fixed to the stern of the boat and having an edge defining a transverse loop that extends rearwardly along substantially the entire length of the hinge member with the free edge thereof being substantially flat and extending forwardly beneath the body portion thereof adjacent the underside of the boat and defining a space opening downwardly, each said trim member having a substantially flat flange along substantially the entire length of the forward edge extending upwardly and rearwardly at an acute angle to the body of the trim member into said space thereby hinging said trim member to said hinge member.

16. The combination set forth in claim 15 wherein said means for varying the inclination of the trim member comprises a link in the form of an inverted V having a pair of diverging arms, each said arm being provided with a ball and socket connection, respectively, with the transom of the boat and the angle member on the trim member.

References Cited

UNITED STATES PATENTS 3,200,782    8/1965    Walden et al. _____ 114—66.5

ANDREW H. FARRELL, *Primary Examiner.*